(12) United States Patent
McNally

(10) Patent No.: US 9,875,556 B2
(45) Date of Patent: Jan. 23, 2018

(54) EDGE GUIDED INTERPOLATION AND SHARPENING

(71) Applicant: FLIR Systems, Inc., Wilsonville, OR (US)

(72) Inventor: Scott McNally, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 5 days.

(21) Appl. No.: 15/235,040

(22) Filed: Aug. 11, 2016

(65) Prior Publication Data

US 2017/0053380 A1    Feb. 23, 2017

Related U.S. Application Data

(60) Provisional application No. 62/206,186, filed on Aug. 17, 2015.

(51) Int. Cl.
| | |
|---|---|
| *H04N 5/225* | (2006.01) |
| *G06T 7/60* | (2017.01) |
| *G06T 7/00* | (2017.01) |
| *G06T 3/40* | (2006.01) |
| *H04N 5/217* | (2011.01) |

(52) U.S. Cl.
CPC ............... *G06T 7/60* (2013.01); *G06T 3/403* (2013.01); *G06T 7/0085* (2013.01); *H04N 5/2254* (2013.01); *H04N 5/2175* (2013.01)

(58) Field of Classification Search
CPC .. H04N 5/2254; H04N 5/2253; H04N 5/2175; G02B 7/08
See application file for complete search history.

(56) References Cited

U.S. PATENT DOCUMENTS

| | | | | |
|---|---|---|---|---|
| 7,336,847 | B2 * | 2/2008 | Duan | G06T 5/005 |
| | | | | 382/266 |
| 8,391,612 | B2 * | 3/2013 | Natroshvili | G06T 7/13 |
| | | | | 382/103 |
| 2002/0186309 | A1 * | 12/2002 | Keshet | H04N 5/2175 |
| | | | | 348/248 |

(Continued)

OTHER PUBLICATIONS

Liu, Junhua, "Trilateral Filtering for Image Interpolation", 2nd International Congress on Image and Signal Processing, Oct. 17-19, 2009, pp. 1-5, IEEE, Piscataway, New Jersey.

(Continued)

*Primary Examiner* — Hung Lam
(74) *Attorney, Agent, or Firm* — Haynes and Boone, LLP

(57) ABSTRACT

Techniques, methods, and systems for image processing may be provided. The image processing may be provided for upsampling and interpolating images. The upsampling and interpolating may include interpolating the image through at least an edge weight and a spatial weight. In various embodiments, the edge weight and/or the spatial weight may be calculated with a kernel. The kernel may be a kernel with a two dimensional (2D) distribution such as a Gaussian kernel, a Laplacian kernel, or another such statistically based kernel. The image processing may also include refining the upsampled and interpolated image through a refinement weight calculation and/or through back projection.

20 Claims, 12 Drawing Sheets

(56) References Cited

U.S. PATENT DOCUMENTS

| | | | |
|---|---|---|---|
| 2007/0185946 A1* | 8/2007 | Basri | G06K 9/34 |
| | | | 708/200 |
| 2007/0223815 A1* | 9/2007 | Makram-Ebeid | G06K 9/34 |
| | | | 382/173 |
| 2010/0119176 A1* | 5/2010 | Ichihashi | G06T 3/403 |
| | | | 382/300 |
| 2016/0284065 A1* | 9/2016 | Cohen | G06T 5/10 |

OTHER PUBLICATIONS

Irani et al., "Motion Analysis for Image Enhancement: Resolution, Occlusion, and Transparency", Journal of Visual Communication and Image Representation, Dec. 1993, pp. 1-24, vol. 4, Issue 4, Elsevier, San Diego, California.

* cited by examiner

EDGE GUIDED INTERPOLATION AND SHARPENING

CROSS-REFERENCE TO RELATED APPLICATIONS

This application claims priority to and the benefit of U.S. Provisional Patent Application No. 62/206,186 filed Aug. 17, 2015 and entitled "EDGE GUIDED INTERPOLATION AND SHARPENING" which is hereby incorporated by reference in its entirety.

TECHNICAL FIELD

One or more embodiments of the invention relate generally to image processing and more particularly to image interpolation and/or sharpening.

BACKGROUND

Various types of imaging devices are used to capture images (e.g., image frames) in response to electromagnetic radiation received from desired scenes of interest. Some such imaging devices, especially compact devices, may capture images in a lower resolution that may then be upsampled to a higher resolution.

In some cases, upsampling aliasing may result in aliasing effects which decrease the quality of the upsampled image. For example, high contrast slanted edges may appear like a staircase instead of a solid line. Methods such as New Edge Directed Interpolation (NEDI) or iNEDI may decrease or eliminate aliasing effects. However, such methods require significant processing power which is often unavailable in certain devices, especially compact devices where captured images may need to be upsampled.

SUMMARY

Techniques are disclosed for systems and methods to upsample and interpolate images. In accordance with an embodiment, a method for processing an image may be disclosed. The method may comprise receiving an image, the image comprising a plurality of pixels with each pixel including a pixel value, selecting a pixel to be processed, determining an edge weight and a spatial weight associated with the selected pixel, wherein at least the spatial weight is determined with a spatial kernel, and processing the image with at least the edge weight and the spatial weight.

In accordance with another embodiment, a system for processing an image may be disclosed. The system may comprise a memory component adapted to receive an image associated with a scene, wherein the image comprises a plurality of pixels with each pixel including a pixel value, and a processing component. The processing component may be configured to execute the instructions to receive the image, select a pixel to be processed, determine an edge weight and a spatial weight associated with the selected pixel, wherein at least the spatial weight is determined with a spatial kernel, and process the image with at least the edge weight and the spatial weight.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, edge aware upsampling and interpolation and/or sharpening techniques for image frames and videos are provided. Such image frames may be captured in response to irradiance at one or more wavebands, such as thermal infrared, near infrared, visible light, and/or other wavelength ranges received from a scene. In certain embodiments, a pixel or a plurality of pixels within an image may be interpolated, refined, and/or back projected. Other embodiments may sharpen images. In some embodiments, the various techniques disclosed herein may be used for real time image processing.

Figure 1A:
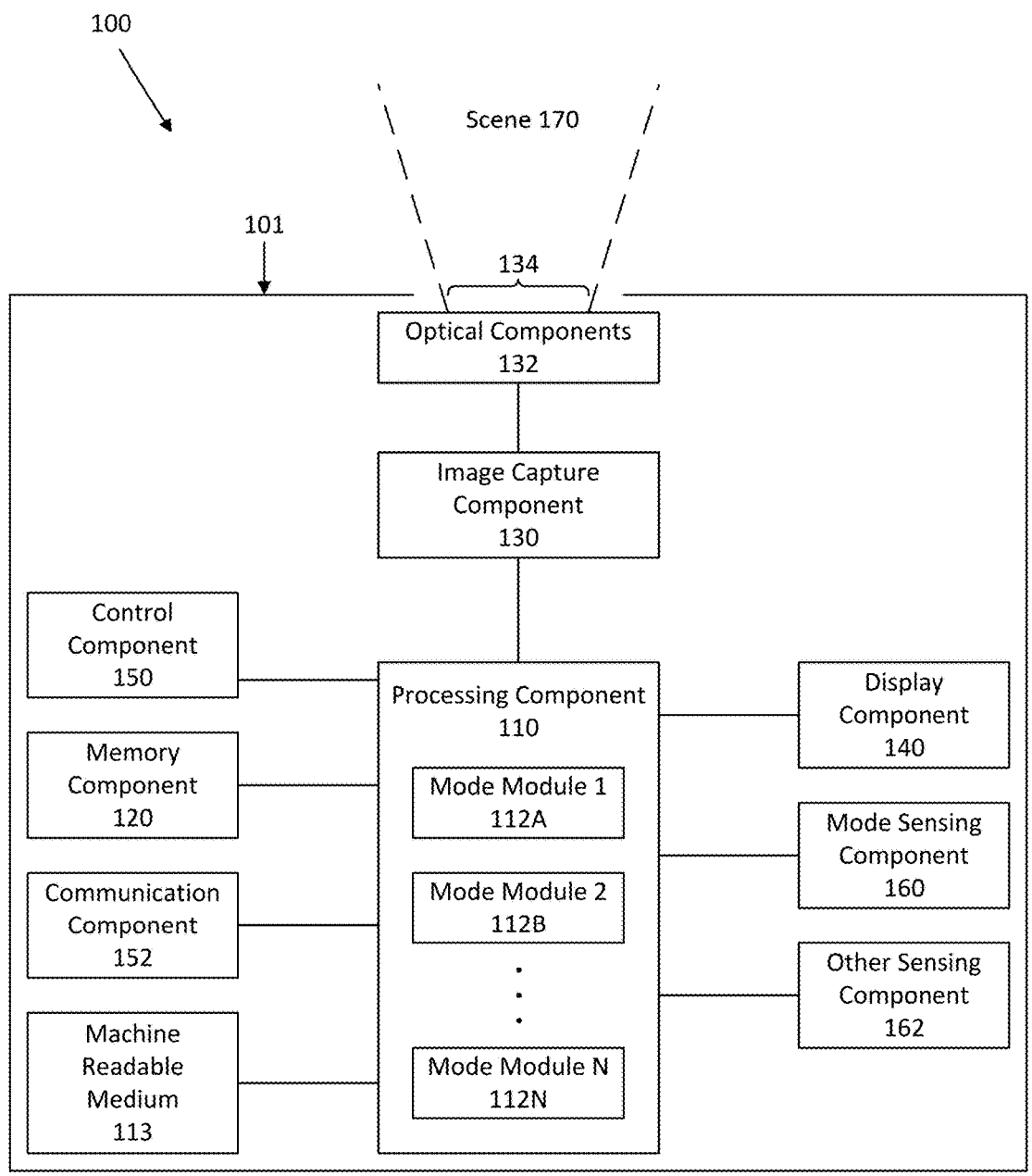
FIG. 1A illustrates a block diagram of an example imaging system in accordance with an embodiment of the disclosure.

FIG. 1A illustrates a block diagram of an example imaging system in accordance with an embodiment of the disclosure. Imaging system 100 in FIG. 1A may be used to capture and process image frames in accordance with various techniques described herein. In one embodiment, various components of imaging system 100 may be provided in a housing 101, such as a housing of a camera, a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a processing component 110, a memory component 120, an image capture component 130, optical components 132 (e.g., one or more lenses configured to receive electromagnetic radiation through an aperture 134 in housing 101 and pass the electromagnetic radiation to image capture component 130), a display component 140, a control component 150, a communication component 152, a mode sensing component 160, and a sensing component 162.

In various embodiments, imaging system 100 may implemented as an imaging device, such as a camera, to capture image frames, for example, of a scene 170 (e.g., a field of view). Imaging system 100 may represent any type of camera system which, for example, detects electromagnetic radiation (e.g., irradiance) and provides representative data (e.g., one or more still image frames or video image frames). For example, imaging system 100 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, imaging system 100 may be integrated as part of a non-mobile installation to provide image frames to be stored and/or displayed.

Processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. Processing component 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in processing component 110 or stored on memory component 120 for access and execution by processing component 110. In another aspect, processing component 110 may be adapted to perform various types of image processing techniques as described herein.

In various embodiments, it should be appreciated that each mode module 112A-112N may be integrated in software and/or hardware as part of processing component 110, or code (e.g., software or configuration data) for each mode of operation associated with each mode module 112A-112N, which may be stored in memory component 120. Embodiments of mode modules 112A-112N (i.e., modes of operation) disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored mode modules 112A-112N provided to imaging system 100 by coupling the machine readable medium 113 to imaging system 100 and/or by imaging system 100 downloading (e.g., via a wired or wireless link) the mode modules 112A-112N from the machine readable medium (e.g., containing the non-transitory information). In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 and/or machine-readable medium 113 to perform various methods, processes, and modes of operations in manner as described herein.

Image capture component 130 includes, in one embodiment, one or more sensors (e.g., any type visible light, infrared, or other type of detector, including a detector implemented as part of a focal plane array) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Processing component 110 may be adapted to receive image signals from image capture component 130, process image signals (e.g., to provide processed image data), store image signals or image data in memory component 120, and/or retrieve stored image signals from memory component 120. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In one embodiment, processing component 110 may initially process a captured thermal image frame and present a processed image frame in one mode, corresponding to mode modules 112A-112N, and then upon user input to control component 150, processing component 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to processing component 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of imaging system 100.

Processing component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 1B:
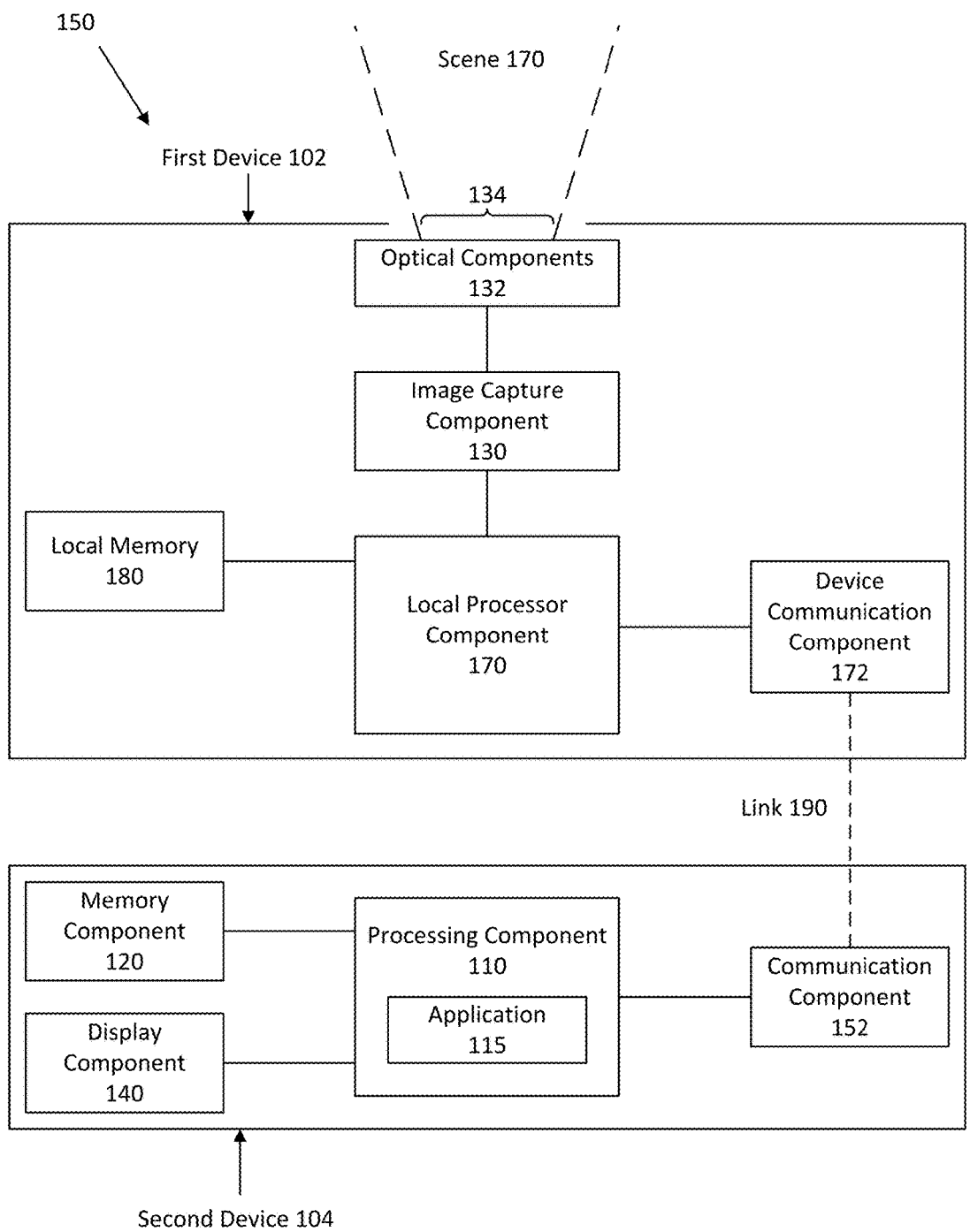
FIG. 1B illustrates a block diagram of another example imaging system in accordance with an embodiment of the disclosure.

FIG. 1B illustrates a block diagram of another example imaging system 150 in accordance with an embodiment of the disclosure. Imaging system 150 includes components distributed over multiple devices. In particular, imaging system 150 includes a first device 102 and a second device 104 (e.g., a mobile phone) in communication with the first device 102. Other embodiments may distribute the components to devices in other days and may, in addition, distribute the components to three or more devices. In various embodiments, either the first device 102 and/or the second device 104 may be a camera, a camera suite, a sensor suite, a smartphone, a computer, a server, a tablet, or another type of electronic device.

In certain embodiments, the first device 102 and the second device 104 may be coupled together. That is, the first device 102 may be a camera attachment that may fitted to the second device 104. The second device 104 may run an application that performs at least part of the image processing. In such an embodiment, the second device 104 may be a smartphone, a tablet, a computer, or another type of electronic device that may receive the camera attachment. In certain embodiments, the camera attachment may be fitted via connectors such as USB or Lightning Cable connectors. Other embodiments may include connect the first device 102 and the second device 104 through a network connection, such as via Bluetooth, the internet, NFC, LAN, or other network connections.

The first device 102 may include the optical components 132, the image capture component 130, a local processor component 170, a local memory 180, and a device communication component 172. The optical components 132, the image capture component 130, and the display component 140 may be similar to the respective components in the imaging system 100 of FIG. 1A.

The local processor component 170 may perform some or all of the processes performed by the processing component 110 in the imaging system 100 of FIG. 1A. For example, the local processor component 170 may be adapted to receive image signals from image capture component 130, process image signals (e.g., to provide processed image data), store image signals or image data in local memory 180, and/or retrieve stored image signals from local memory 180.

The local processor component 170 may also communicate data, via the device communication component 172, to the second device 104. The device communication component 172 may communicate with the second device 104 via a link 190 established between the device communication component 172 and a communication component 152 of the first device 102.

The second device 104 may include the processing component 110, the memory component 120, the display component 140, and the communication component 152. The processing component 110 may also perform some or all of the processes performed by the processing component 110 in the imaging system 100 of FIG. 1A. In certain embodiments, the processing component 110 and the local processor component 170 of the imaging system 150 may include overlapping processes. That is, both the processing component 110 and the local processor component 170 may include the ability to perform similar and/or the same processes. Additionally, the processing component 110 may be configured to receive data from the mobile device 102 via the link 190 established between the device communication component 172 and the communication component 152 and process at least a portion of the data received. The data received may be stored in, for example, the memory component 120, which may be similar to the memory component detailed in FIG. 1A.

After data has been received, the processing component 110 may perform the image processing techniques disclosed herein. The processing component may, for example, load an application 115 to perform the image processing techniques described herein. The application 115 may be stored within the memory component 120, on another memory, or received from another device. Additionally, the processing component 110 may be adapted to process image signals stored in the memory component 120 to provide image data (e.g., captured and/or processed image data) to display component 140 for viewing by a user. The display component 140 may be similar to the display component described in FIG. 1A for imaging system 100 and may include, in one embodiment, an image display device (e.g., a liquid crystal display (LCD)) or various other types of generally known video displays or monitors, similar to the display component.

Figure 2:
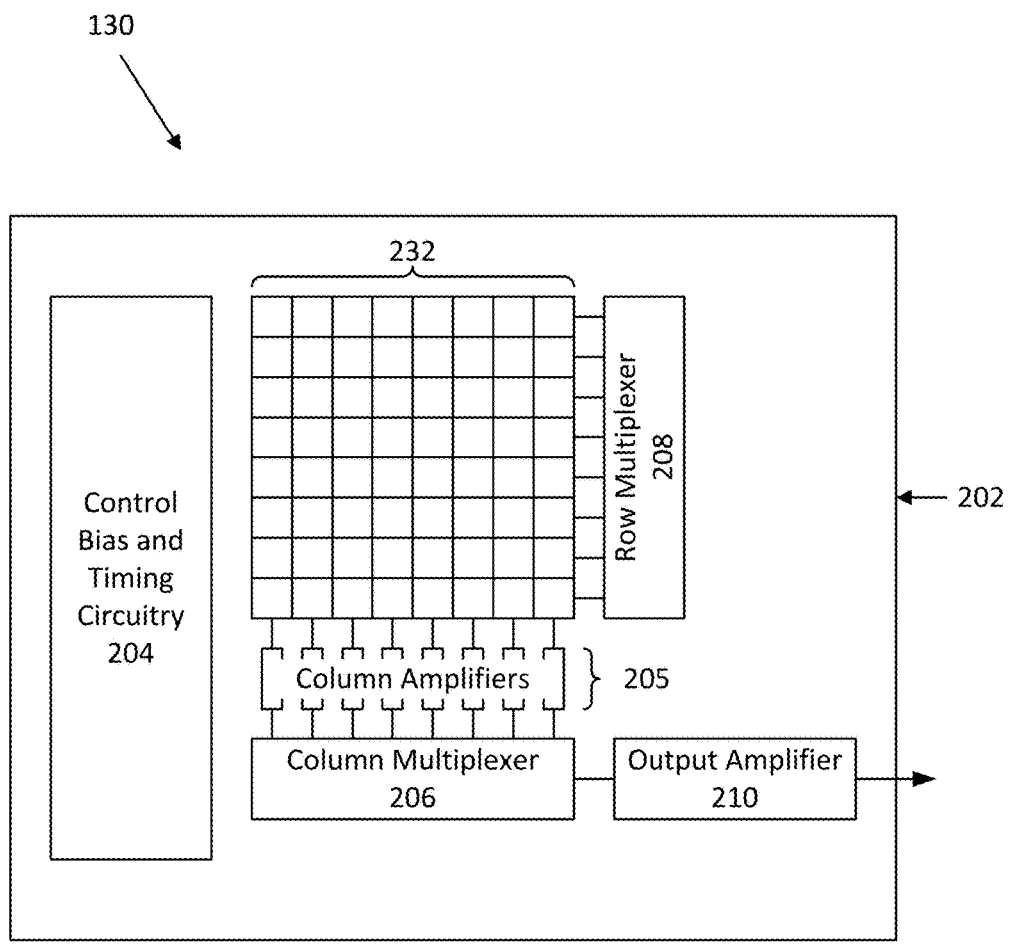
FIG. 2 illustrates a block diagram of an example image capture component in accordance with an embodiment of the disclosure.

FIG. 2 illustrates a block diagram of example image capture component 130 in accordance with an embodiment of the disclosure. In this illustrated embodiment, image capture component 130 is a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to processing component 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
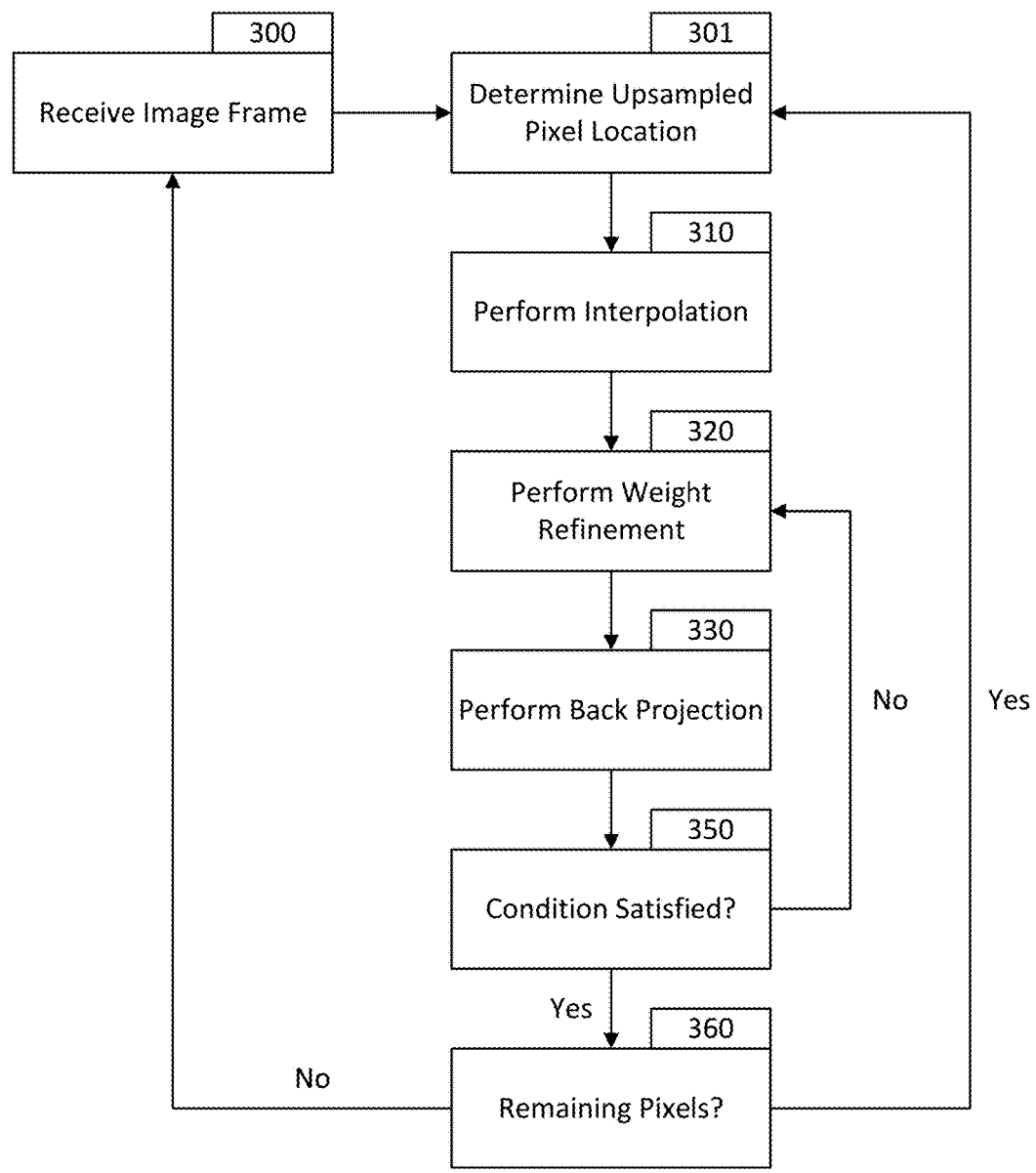
FIG. 3 illustrates a flowchart of image processing performed by an imaging system in accordance with an embodiment of the disclosure.

FIG. 3 illustrates a flowchart of image processing performed by an imaging system in accordance with an embodiment of the disclosure. The technique illustrated in FIG. 3 may be performed by, for example, an imaging processing system similar to the image processing systems 100/150 detailed in FIGS. 1A-1B and/or utilizing the image capture component described in FIG. 2. FIG. 3 illustrates an image processing technique that may reduce or eliminate aliasing in images or upsampled versions of the images while requiring less resources than other processes such as NEDI or iNEDI.

In block 300 of FIG. 3, an image frame is received. The image frame is received by a processing component, such as the processing component 110 of FIGS. 1A and 1B. The image frame may be captured by the image capture component 130 or may be captured by another image capture component or by another device. In embodiments where the image frame is captured by another device, the other device may communicate the image frame to the processing component 110 via, for example, communication devices or components as detailed herein.

The image frame may be a still image or may be a frame in a video. The image frame may, in certain embodiments, be an image frame of a visual image, a thermal image, an electromagnetic image, or of another type of image. The image frame may include a plurality of pixels and may be of a certain resolution. In certain embodiments, the image frame may be a 60×80, 120×160, 240×320, 600×800, 1200× 1500, or other resolution image. The imaging processing disclosed herein may be performed on images of any resolution.

Once the image frame is received in block 300, the image processing continues to block 301. In block 301, the image frame received may, as stated, include a plurality of pixels, and a pixel may be selected to be processed. The pixel selected may be a low resolution pixel (a pixel of a non-upsampled image), or may be a location of a pixel in an upsampled version of the image or future upsampled version of the image (an upsampled pixel or, alternatively, a sub pixel). In embodiments where the pixel is selected before the image has been upsampled, the pixel selected may be a future pixel or upsampled pixel rather than a current low resolution pixel and may be, for example, a location of a high resolution pixel in an (future) upsampled version of the image received in block 300.

The selection of the pixel may be performed according to a pre-defined sequence or logic. For example, certain embodiments may select only pixels or upsampled pixels that have been identified as an edge pixel. Other embodiments may select, in turn, all pixels or upsampled pixels within an image, or may select only pixels related to a certain aspect of the image. The pixels or upsampled pixels may be selected according to certain algorithms or logics (e.g., all appropriate pixels in one column selected from top to bottom, then moving on to the next column, etc.). An example embodiment of block 301 is described in further detail in FIG. 4.

After the pixel or upsampled pixel has been selected in block 301, the image processing continues to block 310. In block 310, interpolation is performed on the image or a section of the image. The image may, during interpolation, be upsampled as well as interpolated. Block 310 may include a plurality of steps. An example embodiment of block 310 is described in further detail in FIG. 5.

After interpolation, weight refinement is performed in block 320 and back projection is performed in block 330. Example embodiments of both weight refinement and back projection are described in further detail in FIGS. 6 and 7, respectively. While the embodiment in FIG. 3 describes weight refinement in block 320 being performed before back projection in block 330, other embodiments may perform back projection before weight refinement, or may perform both back projection and weight refinement concurrently. Additionally, certain embodiments may perform only back projection, only weight refinement, or may not perform back projection and weight refinement at all. In certain such embodiments, the processor may be configured to perform interpolation, back projection, and weight refinement, but may select to forgo at least one of the processes due to, for example, processing capability or time considerations.

After interpolation, weight refinement, and/or back projection have been performed on the image, the process checks to see whether a condition is satisfied in block 350. The condition may be any appropriate condition for finishing processing of the pixel or upsampled pixel. For example, in certain embodiments, the condition may time the processing of a pixel and see if the processing time has exceeded a processing time threshold. If the processing time threshold has not exceeded a processing time threshold, the process may loop back to an earlier block (such as block 310, 320, and/or 330) for continued processing. FIG. 3 shows the process looping back to block 320, but other processes may loop back to any one of blocks 310, 320, and/or 330 for another round of processing of interpolation, weight refinement, and/or back projection. If the processing time has exceeded the processing time threshold, the condition may be satisfied. Other embodiments may include conditions to cease processing of the pixel or upsampled pixel that may depend on the quality of the image processed (e.g., whether a downsampled version of the upsampled and interpolated image matches the original image), may have a condition that depends on other factors such as available processing resources or selected user or factory set conditions (e.g., a user may select to repeat one, some, or all of blocks 310, 320, and 330 a certain amount of times), or may include some other end condition.

If the process determines that the condition in block 350 is satisfied, the process then continues to block 360 to determine whether additional pixels or upsampled pixels should be processed. If block 360 determines that there are more pixels or upsampled pixels to be processed, the process returns to block 301 to select another pixel or upsampled pixel to process. The next pixel or upsampled pixel may be selected according to a spatial relationship (e.g., all appropriate pixels in one column selected from top to bottom, then moving on to the next column, etc.) or may be selected according to another logic.

If it is determined in block 360 that there are no additional pixels or upsampled pixels in the image to process in block 360, the process then proceeds to block 300 and selects another image or frame to process. In certain embodiments, the block 360 may also determine if there are additional images or frames to process. If it is determined that there are no additional images or frames to process, the image processing may finish.

Figure 4:
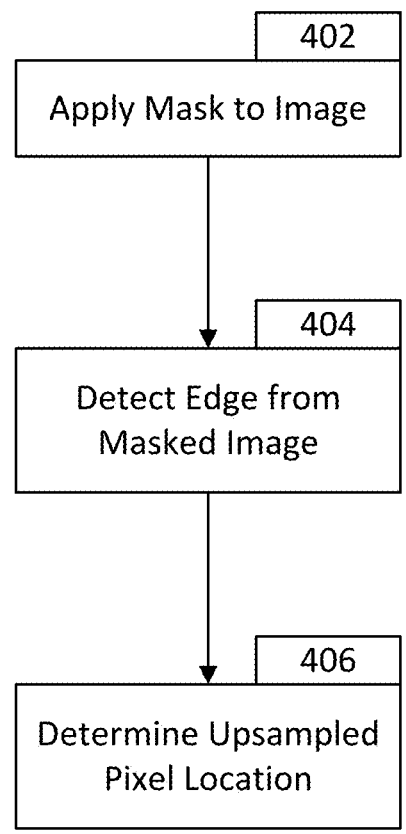
FIG. 4 illustrates a flowchart of a pixel selection process performed by an imaging system in accordance with an embodiment of the disclosure.

FIG. 4 illustrates a flowchart of a pixel selection process performed by an imaging system in accordance with an embodiment of the disclosure. FIG. 4 describes, in further detail, block 301 of FIG. 3. In certain embodiments, a process may select only pixels or upsampled pixels identified as edge pixels while other embodiments of the process may select all pixels within an image. For the purposes of this disclosure, an "upsampled pixel" (e.g., sub pixel) may be a location of a pixel in an upsampled version of the image. The "upsampled pixel" may, in certain examples, not be an actual currently existing pixel of an image and may be, instead, where a pixel will be in the upsampled version of the image.

In block 402 of FIG. 4, an image frame may already have been received in block 300 of FIG. 3 and, after receiving the image, a mask is applied to the image. The mask may, in certain embodiments, be used to filter the image to allow for the detection of edges within the image. In certain embodiments, the mask may be, for example, a Sobel mask or another mask applied to detect edges.

After the mask has been applied to the image in block 402 the edges of the image is detected in block 404. In certain embodiments, block 404 may be optional. Certain such embodiments may not formally detect edges. Such embodiments may, for example, perform interpolation for all pixels or upsampled pixels. Embodiments where edge detection is performed may perform edge detection through any edge detection process that may be understood within image processing. In certain embodiments, edge detection may detect not only edges, but may also detect any discontinuities within the image.

In block 406, the upsampled pixel is then determined. In certain embodiments the upsampled pixel may only be located in portions of the image that are identified as edge locations, but other embodiments may locate the upsampled pixel in any area of the image. For example, in such an embodiment, if the upsampled version of the image is to be a 480×640 image, there may determined to be 307,200 upsampled pixels; one for each pixel of the 480×640 image. One, some, or all of those upsampled pixels may be identified for interpolation.

Figure 5:
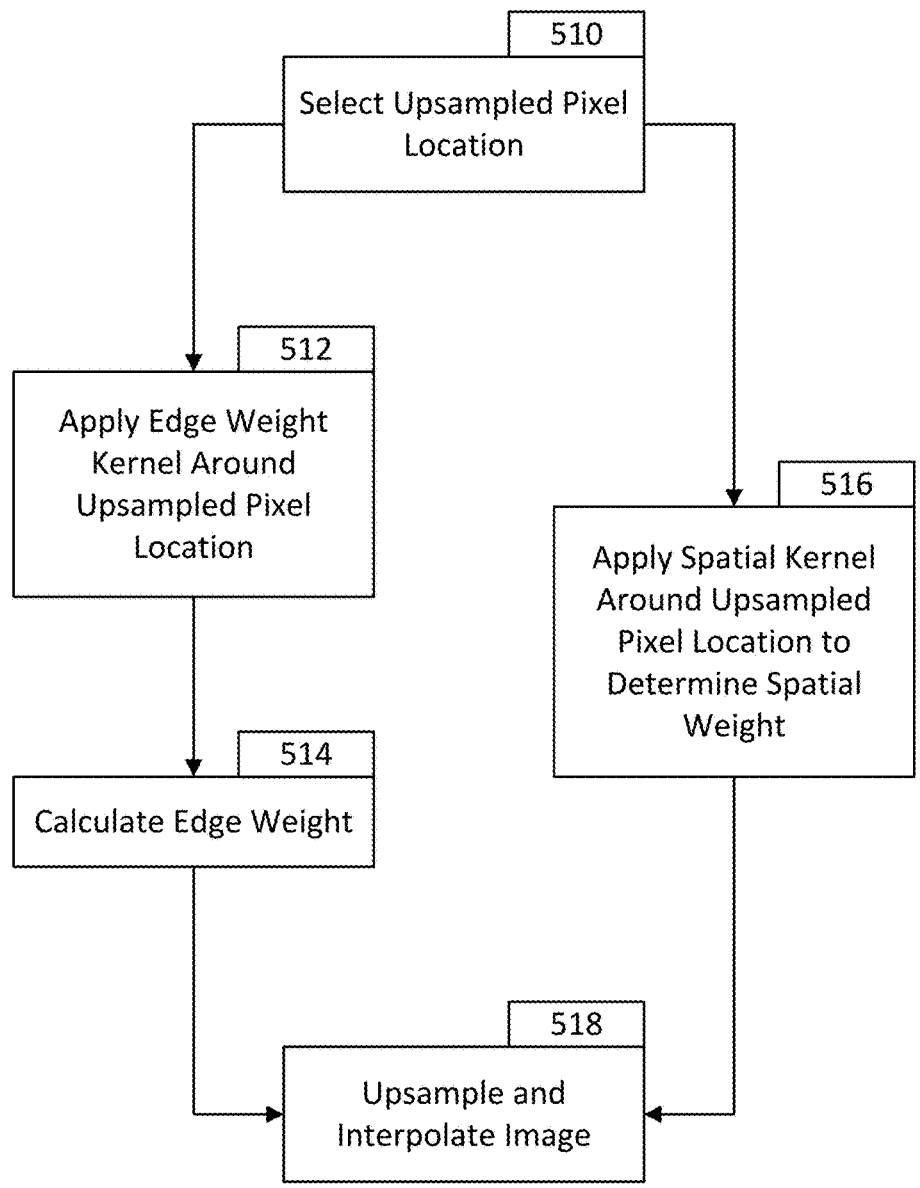
FIG. 5 illustrates a flowchart of an image interpolation process performed by an imaging system in accordance with an embodiment of the disclosure.

FIG. 5 illustrates a flowchart of an image interpolation process performed by an imaging system in accordance with an embodiment of the disclosure. FIG. 5 describes, in further detail, block 310 of FIG. 3. FIG. 5 may describe interpolation as performed during upsampling of an image, but with certain differences, an image may also be sharpened instead of upsampled and interpolated. The differences to sharpen an image instead of upsample and interpolate the image will be described at the end of the description for FIG. 5.

In block 510, the upsampled pixel is selected. In certain embodiments, block 510 may be performed as block 406. That is, once the upsampled pixel has been identified in block 406, the upsampled pixel may be automatically selected and processing of the upsampled pixel (e.g., interpolation and refinement) may be performed. Other embodiments may first determine all upsampled pixels within an image or a portion of an image before selecting one or more upsampled pixels for interpolation and upsampling. Selection of the upsampled pixel may be performed according to certain logic such as, for example, processing of pixels in an order by rows, by columns, or by first selecting the upsampled pixels in areas with the largest discontinuity (e.g., the greatest differences between values of pixels located next to each other).

In certain embodiments, as part of the upsampled pixel selection process, the closest low resolution pixels (i.e., the pixels of the non-upsampled image that are closest to the upsampled pixel) may be identified. In certain such embodiments, the closest 2×2, 3×3, 4×4, 5×5, 3×2, 4×2, 4×3, or other sized group of low resolution pixels to the upsampled pixel may be identified. The size of the group of closest low resolution pixels identified may be any size. The group of closest low resolution pixels may be used to determine the edge weight and the spatial weight and may be referred to as a neighborhood set. The neighborhood set may be a set of low resolution pixels that may be processed by a kernel. Certain embodiments may use the same neighborhood set for calculating the edge weight and the spatial weight, but other embodiments may use different neighborhood sets (e.g., different size groups of closest low resolution pixels) for calculating the edge weight and the spatial weight.

After the upsampled pixel has been selected in block 510, the interpolation process then splits into an edge weight calculation process (shown in blocks 512 and 514) and a spatial weight calculation process (shown in block 516). The edge weight and spatial weight calculations may be performed independently of each other. In certain embodiments, the edge weight may be calculated before the spatial weight or vice versa, or the edge weight and the spatial weight may be calculated concurrently or at least somewhat concurrently. In other embodiments, the edge weight may be calculated after the spatial weight has been calculated, or vice versa.

In block 512, an edge weight kernel is applied around the upsampled pixel (e.g., to transform the neighborhood set of low resolution pixels around the upsampled pixel). The edge weight kernel in various embodiments may be of various sizes. For example, the edge weight kernel may be 2×2, 3×3, 4×4, 5×5, 3×2, 4×2, 4×3, or other size kernels. In certain embodiments, the size of the edge weight kernel may be the same size as the amount of pixels within the neighborhood set. That is, if the neighborhood set is a 3×3 group, the edge weight kernel may also be a 3×3 kernel.

The edge weight kernel may be a variety of different types of different kernels. For example, the edge weight kernel may be a Gaussian kernel (a kernel of a Gaussian distribution), a shifted Gaussian kernel, or a kernel based on other two dimensional (2D) distributions such as Laplacian distribution. The edge weight kernel may be a distribution that is designed to detect an edge along a specific direction (e.g., a kernel to indicate diagonal edges when applied to group of closest low resolution pixels). Certain embodiments may apply a multiple edge weight kernels to detect edges along multiple directions (e.g., kernels to detect edges along a horizontal, vertical, 45 degree, 135 degree, 30 degree, 60 degree, etc. direction). For Gaussian based kernels, the kernels may also include a sigma value to configure or weight the Gaussian distribution. Various embodiments may include sigma values of any value, but certain embodiments may include a sigma value of between 0.2 to 0.8, such as 0.5.

The edge weight kernel or multiple edge weight kernels may be applied around the upsampled pixel (e.g., edge weight kernels may be applied to the neighborhood set). The edge weight kernel(s) may transform the pixel values of the low resolution pixels of, for example, the neighborhood set by modifying the pixel values to derive weighted pixel edge values from pixel values of the low resolution pixels. Certain embodiments may use multiple edge weight kernels to calculate a weighted pixel edge value.

After the weighted pixel edge values have been obtained, the edge weights of the low resolution pixels is calculated in block 514. The edge weight may be calculated by, at least, summing the absolute values of each of the weighted pixel edge values calculated in block 512. Certain embodiments may sum the absolute values of each of the weighted pixel edge values for each low resolution pixel to calculate an edge weight for each low resolution pixel. Additionally, in certain embodiments, the sum of the absolute values of the weighted pixel edge values or weighted pixel edge values of each low resolution pixel may be incorporated into an equation to calculate or weight the edge weight. The equation may additionally include other parameters to help calculate the edge weight. In certain embodiments, suppression of pixel weights determined to be from pixels close to edges may be desired. In such embodiments, the equation may be an exponential equation (possibly with additional parameters) to aid in the suppression of pixel weights determined to be from pixels identified as edge pixels. An example of such an equation may be, for example, the following Equation 1:

$$\text{edge weight}(x,y) = \text{exp. func. [weighting factor}^*(\text{sum of abs. val. weighted pixel edge values}(x,y))] \quad \text{(Equation 1)}$$

Referring now to the spatial weight calculation process, in block 516, a spatial kernel is applied around the upsampled pixel to, for example, a neighborhood set of low resolution pixels to determine a spatial weight. The spatial kernel may be similar to the edge weight kernel, or may be different from the edge weight kernel. In various embodiments of the spatial kernel, the spatial kernel may be of various sizes. For example, the spatial kernel may be 2×2, 3×3, 4×4, 5×5, 3×2, 4×2, 4×3, etc. size kernels. In certain embodiments, the size of the spatial kernel may be the same size as the size of the group of closest low resolution pixels. The spatial kernel may also be a variety of different types of different kernels such as a Gaussian kernel, a shifted Gaussian kernel, or a kernel based on other 2D distributions such as Laplacian distribution. For Gaussian based kernels, the kernels may also include a sigma value to configure or weight the Gaussian distribution. Various embodiments may include sigma values of any value, but certain embodiments may include a sigma value of between 0.2 to 0.8, such as 0.5.

The spatial kernel may be applied around the upsampled pixel to determine a spatial weight for each of the low resolution pixels of a neighborhood set. The spatial kernel may transform the pixel values of the low resolution pixels of the neighborhood set around the upsampled pixel to weighted pixel distance values by more heavily weighing the pixel values of pixels closer to the upsampled pixel. In certain embodiments, the distance of the upsampled pixel relative to a low resolution pixel, such as the low resolution pixel closest to the upsampled pixel, may be determined. Such embodiments may then modify or shift the spatial kernel according to the distance of the upsampled pixel from the low resolution pixel.

In some embodiments, the spatial kernel may be a Gaussian or other two dimensional (2D) distribution that may weigh the value of the pixel or pixels closest to the upsampled pixel more heavily than the value of the pixel or pixels farther from the upsampled pixel. In certain such embodiments, the kernel may be shifted, based on the location of the upsampled pixel relative to the low resolution pixels (e.g., a Gaussian kernel may be shifted based on the location of the upsampled pixel to that of the nearest low resolution kernel). This allows spatial weighting to more heavily weight the pixel weights of low resolution pixels that are closer to the upsampled pixel and decrease the weight of low resolution pixels that are farther away from the upsampled pixel while also taking into account the distance of the upsampled pixel to that of the closest low resolution pixel. The kernels and the shifting of the kernels may be described in further detail in the description for FIG. 8A.

After the edge weight and the spatial weight are calculated, the image is upsampled and interpolated in block 518. The image may be upsampled by increasing the resolution of the image. The upsampled image may be a higher resolution as compared to the original image. The pixel values of the pixels of the upsampled image may be interpolated from pixel values of corresponding pixels from the low resolution image. The pixel values of parts of or all of the upsampled image may be determined or interpolated through calculations involving at least the edge weight and the spatial weight. Certain embodiments may only interpolate the pixel values of edge pixels through the use of the edge weight and/or the spatial weight, but other embodiments may interpolate all pixels of an image using calculations that use the edge weight and/or the spatial weight.

The pixel values of the upsampled pixels may be interpolated by, for example, weighting the pixel values of the low resolution pixels closest to the upsampled pixel according to the edge weight and/or the spatial weight. In certain embodiments utilizing a 3×3 kernel, the pixel value of the upsampled pixel may be calculated for example, by the following Equation 2:

$$\text{pixel weight } (x, y) = \frac{\sum_{k=-1}^{1} \sum_{l=-1}^{1} \text{edge weight } (k, l) * \text{spatial weight } (k, l) * \text{pixel value } (k, l)}{\sum_{k=-1}^{1} \sum_{l=-1}^{1} \text{edge weight } (k, l) * \text{spatial weight } (k, l)} \quad \text{(Equation 2)}$$

where the low resolution pixel at (0,0) (i.e., when k=0 and l=0) may be the low resolution pixel closest to the location of the upsampled pixel and (x,y) may be the location of the upsampled pixel. Other size kernels may be possible and the formulation for embodiments using other sized kernels may be adjusted accordingly. Additionally, other ways of calculating the pixel weight that may be different from the example described may also be used.

In certain embodiments, the pixel weight may be calculated for all upsampled pixels (that is, the locations of all pixels that would be present in an upsampled version of the image). In such an embodiment, due to the mask applied in block 402, the pixel values of non-edge pixels may be zero. In such an embodiment, though all upsampled pixels are processed, non-edge pixels may be quickly processed due to the pixel value of the pixels being zero. In other embodiments, the pixel weights of only the edge pixels may be interpolated. After block 518, interpolation of the upsampled pixels may be fully performed and the image processing may proceed to another step or to repeating interpolation of the upsampled pixel or another upsampled pixel.

Certain embodiments may perform sharpening instead of interpolation. In such an embodiment, instead of processing an upsampled pixel, the technique may process a current pixel (a pixel that is already a part of the image rather than a pixel that may be a part of an upsampled version of the image). Accordingly, instead of applying an edge weight kernel and/or spatial kernel to an upsampled pixel and shifting the kernels responsive to the location of the upsampled pixel to that of a current pixel or nearest current pixel, the edge weight kernel and/or spatial kernel may be applied to a current pixel. In such an embodiment, the edge weight kernel and/or spatial kernel may not be shifted as it is already centered on the current pixel being processed. Additionally, in sharpening, upsampling of the image may not be performed.

Accordingly, in such an embodiment, block 510 selects a location of a current pixel (i.e., a pixel of the current image). In certain embodiments, the pixels closest to the current pixel may be transformed by a kernel for the edge weight and/or the spatial weight calculation. In certain other embodiments, not all of the pixels closest to the current pixel may be transformed by a kernel for the edge weight and/or the spatial weight calculation. In such an embodiment, the kernel may transform a set of pixels grouped around the current pixel such as every other pixel in a 6×6 group, etc.

Figure 6:
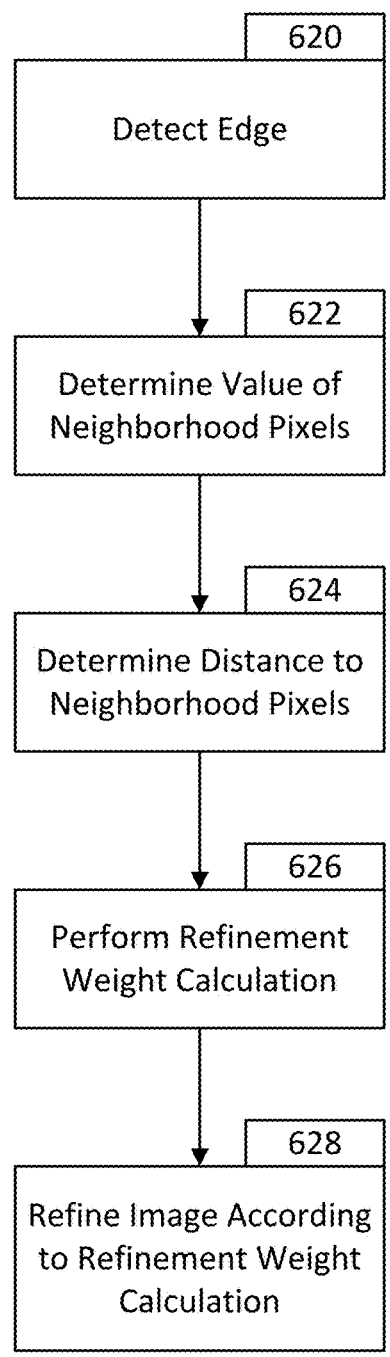
FIG. 6 illustrates a flowchart of a weight refinement process performed by an imaging system in accordance with an embodiment of the disclosure.

The image processing described here may also include additional steps that may further refine the image. One such additional step is described in FIG. 6. FIG. 6 illustrates a flowchart of a weight refinement process performed by an imaging system in accordance with an embodiment of the disclosure. FIG. 6 describes, in further detail, block 320 of FIG. 3.

In block 620 an edge is detected. The edge, or any discontinuity, may be detected in a similar manner to that described in block 404 of FIG. 4. The edge may be detected after a Sobel masked has been applied to the image. In certain embodiments, detection of an edge in block 620 may be optional.

In block 622, the pixel values of at least two neighborhood pixels is determined. The two neighborhood pixels may be pixels that directly neighbor the upsampled pixel or may be pixels that are separated by the upsampled pixel by one or more intervening pixels. In certain embodiments, the two neighborhood pixels may be low resolution pixels on either side of the upsampled pixel. In such an embodiment, the low resolutions pixels would reside on substantially opposite sides of the upsampled pixel. However, while the low resolution pixels of certain embodiments may be the low resolution pixels that are closest to the upsampled pixel that reside on either side of the upsampled pixel, other embodiments may utilize low resolution pixels on either side of the upsampled pixel that are not the closest low resolution pixels to the upsampled pixel. Once the two neighborhood pixels are determined, the pixel values of the neighborhood pixels may then be determined.

In block 624, a distance between the upsampled pixel to at least one of the neighborhood pixels is determined. In certain embodiments, the distances of the upsampled pixel to both of the neighborhood pixels may be determined.

In block 626, a refinement weight calculation is performed. The refinement weight calculation may take into account the pixel values of the adjoining pixels as well as the distance or distances of the upsampled pixel to one or more of the adjoining pixels.

In certain interpolation schemes, the pixel value of the upsampled pixel may be determined by linearly averaging the pixel values of the adjoining pixels according to the distance between the two pixels (e.g., using an equation such as pixel value=(pixel value 1)*(1−dx1)+(pixel value 2)*(1−dx2) where pixel value 1 is the pixel value of a first adjoining pixel, pixel value 2 is the pixel value of a second adjoining pixel, dx1 is the distance of the upsampled pixel from the first adjoining pixel where 0 means the upsampled pixel is at the same point as the first adjoining pixel, 0.5 means the upsampled pixel is between the first and second adjoining pixel, and 1 means the upsampled pixel is at the same point as the second adjoining pixel, and dx2 is the distance of the upsampled pixel from the second adjoining pixel). In block 626, the refinement weight calculation may, instead of determining the pixel value of the upsampled pixel through linearly averaging the pixel values of the adjoining pixels, interpolate the pixel value by increasing the contribution of the pixel weight of the closer pixel while decreasing the contribution of the pixel weight of the farther pixel. Certain such embodiments of the refinement weight calculation may be an exponential equation or may only increase the pixel weight of the closer pixel if the distance of the closer pixel is within a certain threshold distance of the upsampled pixel. Certain such embodiments may progressively increase the contribution of the pixel weight of the closer pixel according to the distance between the closer pixel and the upsampled pixel (e.g., increase the weight the closer the closer pixel is to the upsampled pixel). In various embodiments, the refinement weight calculation may also include edge detection parameters (such as a part of or a variation of the edge weight calculation) as well as tuning parameters.

In block 628, once the refinement weight calculation has been performed, the image is refined according to the refinement weight calculation. Certain embodiments may modify the pixel value of the upsampled pixel determined by interpolation performed in block 518 with the refinement weight calculation, while other embodiments may perform interpolation by incorporating the edge weight, spatial weight, and refinement weight as three factors in calculating the pixel value of the upsampled pixel. Such embodiments may, for example, calculate the pixel value of the upsampled pixel for example, by the following Equation 3:

$$\text{pixel weight } (x, y) = \frac{\sum\limits_{k=-1}^{1} \sum\limits_{l=-1}^{1} \text{edge weight } (k, l) * \text{spatial weight } (k, l) * \text{refinement weight } (k, l) * \text{pixel value } (k, l)}{\sum\limits_{k=-1}^{1} \sum\limits_{l=-1}^{1} \text{edge weight } (k, l) * \text{spatial weight } (k, l) * \text{refinement weight } (k, l)}$$

(Equation 3)

In certain embodiments, weight refinement may be performed for only a portion of the image, such as portions of the image with detected edges, but other embodiments may perform weight refinement for the entire image.

Figure 7:
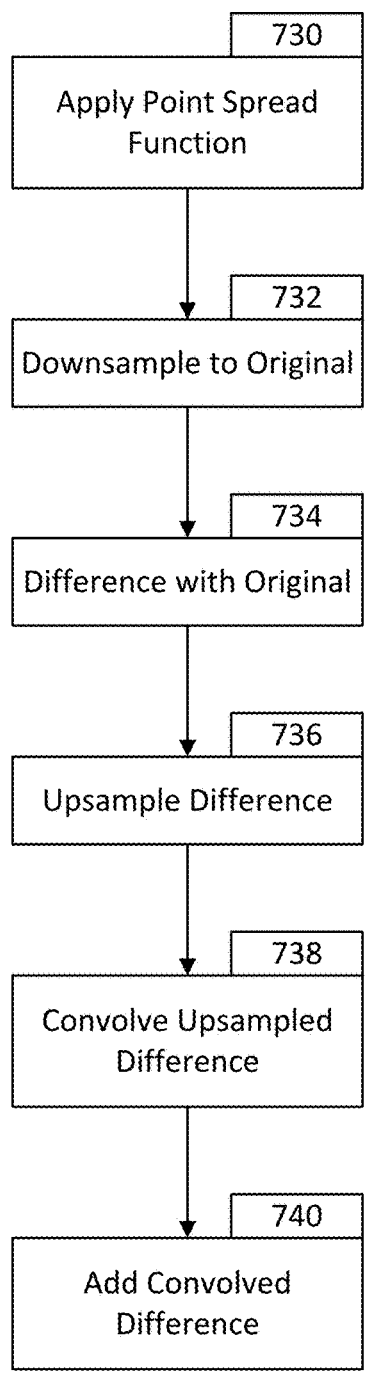
FIG. 7 illustrates a flowchart of a back projection process performed by an imaging system in accordance with an embodiment of the disclosure.

Before, after, or concurrently with the calculation of the refinement weight, back projection may also be performed to refine the image. FIG. 7 illustrates a flowchart of a back projection process performed by an imaging system in accordance with an embodiment of the disclosure. FIG. 7 describes, in further detail, block 330 of FIG. 3.

In block 730, a point spread function (PSF) is applied to the upsampled image to create a PSF processed image. The upsampled image may be the upsampled and interpolated image processed in block 518, the image refined in block 628, or another image. The PSF may blur the upsampled image.

In block 732, the PSF processed image is downsampled to the original (non-upsampled) resolution. The image downsampled in block 732 is then be compared to the original image in block 734. The differences between the downsampled image and the original image may be determined and a differenced image may be created based on the differences.

In block 736, the differenced image is upsampled. The differenced image may be upsampled through a variety of processes such as the processes of FIGS. 3 to 6 or through other processes such as linear interpolation.

After the differenced image has been upsampled, the upsampled differenced image is convolved, in block 738, with an inverse of the PSF of block 730. The convolved difference is then be added to the upsampled image in block 740.

In certain embodiments, the back projection process of FIG. 7 may be iterated. In such embodiments, the back projection process may be iterated until a threshold condition has been met. In certain embodiments, the threshold condition may include, for example, performing the back projection process a certain amount of times (such as once, twice, three times, or four times or more), performing the back projection process until the upsampled image has reached a certain image quality threshold, or performing the back projection process for a certain amount of time.

Figure 8A:
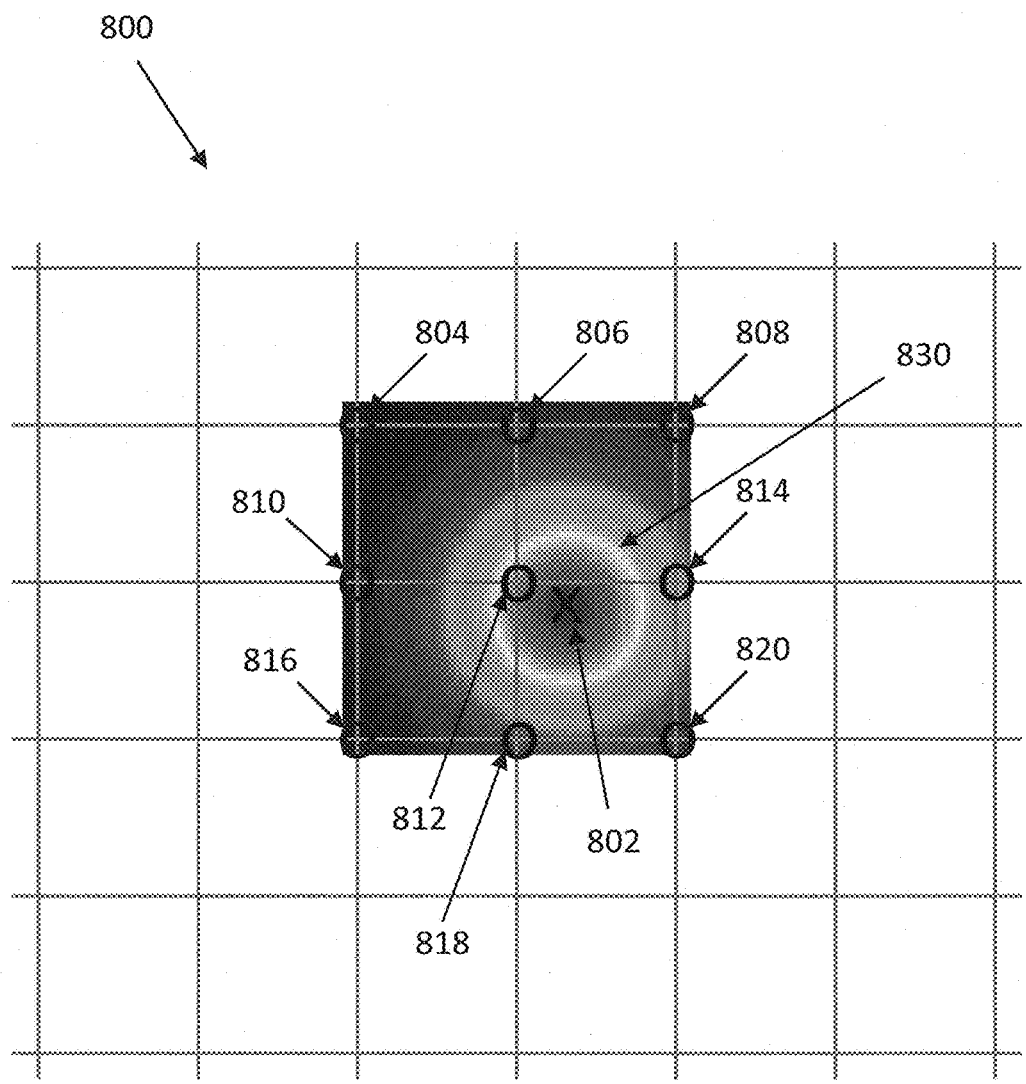
FIG. 8A illustrates an example distribution of low resolution images and an upsampled pixel for an image in accordance with an embodiment of the disclosure.

The process may use kernels to determine, at least, the edge weight and/or the spatial weight. An example of such a kernel may be shown in FIGS. 8A and 8B. FIG. 8A illustrates an example distribution of low resolution images and an upsampled pixel for an image in accordance with an embodiment of the disclosure.

Diagram 800 of FIG. 8A includes a shifted kernel 830, a upsampled pixel 802, and low resolution pixels 804-820. In FIG. 8A, the upsampled pixel 802 may be a location of a pixel in a future upsampled version of an image. The low resolution pixels 804-820 may be pixels on a current (non-upsampled) version of the image. The image may be subjected to upsampling and interpolation, as well as weight refinement and back projection. In FIG. 8A, the pixel 812 may be the low resolution pixel closest to the upsampled pixel 802 while the pixel 804 may be the low resolution pixel farthest from the upsampled pixel 802.

The shifted kernel 830 may be, for example, a Gaussian based kernel, a Laplacian based kernel, or a kernel based on another 2D distribution. The distribution of the shifted kernel may be shown by the grayscale distribution. The kernel 830 may be shifted so that the heaviest weight of the kernel is centered on the upsampled pixel 802. Thus, the shifted kernel may more heavily weight the pixel weights of the pixels closer to the upsampled pixel 802. Accordingly, out of the 9 low resolution pixels, the shifted kernel 830 may, when used in edge weight or spatial weight determination, most heavily weight the pixel value of the pixel 812, and least heavily weight the pixel value of the pixel 804.

Figure 8B:
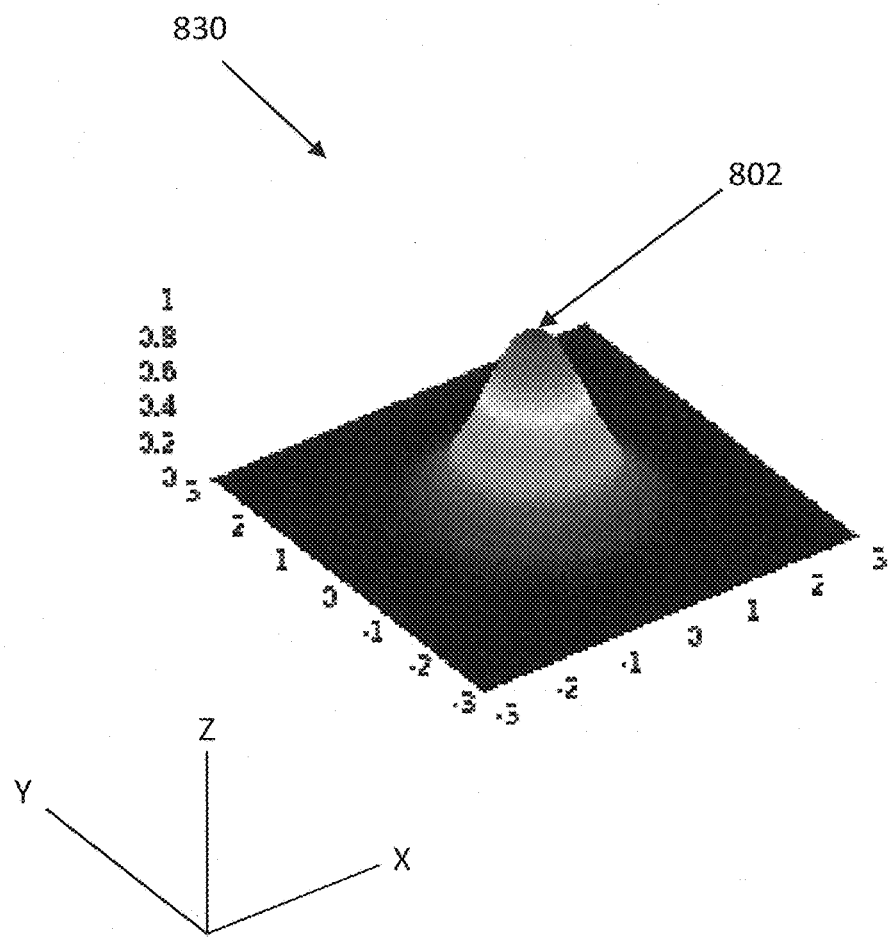
FIG. 8B further illustrates the example distribution of FIG. 8A in accordance with embodiments of the disclosure.

FIG. 8B further illustrates the example distribution of FIG. 8A in accordance with an embodiment of the disclosure. FIG. 8B shows a three dimensional (3D) representation of the distribution of the shifted kernel 830. Though the shifted kernel 830 may be based on a 2D distribution, the 2D distribution refers to the weighting of the pixel relative to the distance of the pixel from the upsampled pixel along a two dimensional axis. In practice, for a distribution such as the 3×3 pixel distribution shown in FIG. 8A, the weighting distribution of the shifted kernel 830 may be visualized in a three dimensional manner as shown in FIG. 8B. In FIG. 8B, the vertical z-axis may represent the weight while the x and y-axes may represent distances where 1 unit may be the distance of 1 pixel.

The shifted kernel 830 may more heavily weight the pixel weights of pixels near the center of the distribution. The shifted kernel 830 may have the heaviest weight in the center of the distribution, which may be, for example, centered on the upsampled pixel 830 of FIG. 8A. Pixels farther from the center of the distribution may be weighted less.

Results of the processes described herein may be shown in FIGS. 9A-D. FIGS. 9A-D illustrate various images captured and/or processed by an imaging system in accordance with an embodiment of the disclosure.

Figure 9A:
FIGS. 9A-D illustrate various images captured and/or processed by an imaging system in accordance with an embodiment of the disclosure.
Figure 9B:

FIG. 9A shows an image originally captured by an imaging system. The image in FIG. 9A has not been processed. FIG. 9B shows the image of FIG. 9A after sharpening has been performed. Thus, the image of FIG. 9B has been processed with blocks 300, 301, 350, and 360 and a sharpening version of block 310 of FIG. 3. The image of FIG. 9B has the contrast enhanced at certain points of the image, including near the faces of the two people present.

Figure 9C:
Figure 9D:

FIGS. 9C and 9D show images that have been upsampled. Though FIGS. 9A-D are all shown in the same sizes in the Figures, FIGS. 9A and 9B are actually 60×80 pixel images while FIGS. 9C and 9D are 120×160 pixel images.

FIG. 9C has been upsampled with a 2×2 kernel and back projected. Thus, the image in FIG. 9C has been processed with blocks 300, 301, 310, 330, 350, and 360 of FIG. 3. FIG. 9D has been upsampled with a 3×3 kernel. Thus, the image in FIG. 9D has been processed with blocks 300, 301, 310, 350 and 360 of FIG. 3. As shown, both FIGS. 9C and 9D show improvements in image quality when compared to the base image, FIG. 9A.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
   receiving an image, the image comprising a plurality of pixels with each pixel including a pixel value;
   selecting a pixel to be processed;
   determining an edge weight and a spatial weight associated with the selected pixel, wherein at least the spatial weight is determined with a spatial kernel; and
   processing the image with at least the edge weight and the spatial weight.

2. The method of claim 1, wherein the spatial kernel is a Gaussian based kernel and/or is based on a two dimensional (2D) distribution.

3. The method of claim 1, wherein the selected pixel is an upsampled pixel, the upsampled pixel is the location of a pixel in the upsampled image, the processing the image comprises interpolating the image with at least the edge weight and the spatial weight and the method further comprises upsampling the image.

4. The method of claim 3, wherein the determining the edge weight comprises:
   applying an edge weight kernel to a neighborhood set of the pixels to determine weighted pixel edge values for the pixels of the neighborhood set;
   determining an edge indicator value using at least the weighted pixel edge values; and
   determining the edge weight using at least the edge indicator value.

5. The method of claim 3, wherein the spatial kernel comprises an N×N distribution, where N is an integer equal to or greater than 3 and the determining the spatial weight comprises:
   determining a distance from the upsampled pixel to at least one pixel within a neighborhood set of the pixels, wherein the at least one pixel is a central pixel of the neighborhood set, and wherein the central pixel is a pixel of the neighborhood set closest to the upsampled pixel;
   shifting the spatial kernel according to the distance; and
   applying the spatial kernel to a plurality of pixels within the neighborhood set to determine the spatial weight.

6. The method of claim 3, further comprising:
   applying a point spread function (PSF) to the interpolated and upsampled image to create a PSF processed image;
   downsampling the PSF processed image;
   determining a differenced image by differencing the PSF processed image with the received original image;
   upsampling the differenced image;
   applying an inverse of the PSF to the upsampled differenced image to create a convolved image; and
   combining the convolved image with the interpolated and upsampled image.

7. The method of claim 1, further comprising:
   determining pixel values of at least two pixels located on either side of the selected pixel within a portion of the image, wherein the portion includes the selected pixel;
   determining a distance between the selected pixel and at least one of the two pixels;
   determining a refinement weight using, at least, the pixel values of the at least two pixels and the distance between the selected pixel and the at least one of the two pixels; and
   further processing the processed image with at least the refinement weight.

8. The method of claim 1, further comprising:
   applying a mask to at least a portion of the image; and
   determining, after applying the mask, an edge within the image.

9. The method of claim 1, wherein:
   the processing the image comprises sharpening the image with at least the edge weight and the spatial weight;
   the determining an edge weight comprises:
      applying an edge weight kernel to a neighborhood set of the pixels of the image to determine weighted pixel edge values for the pixels of the neighborhood set,
      determining an edge indicator value using at least the weighted pixel edge values, and
      determining the edge weight using at least the edge indicator value; and
   the image includes a neighborhood set of the pixels, the neighborhood set includes a plurality of pixels including the selected pixel, and determining the spatial weight comprises:
      determining a distance from the selected pixel to at least one pixel within the neighborhood set,
      shifting the spatial kernel according to the distance, and
      applying the spatial kernel to a plurality of pixels within the neighborhood set to determine the spatial weight.

10. The method of claim 1, wherein the selected pixel is a first pixel, the method further comprising:
   selecting a second pixel to be processed;
   determining an edge weight and a spatial weight associated with the second selected pixel, wherein at least the spatial weight is determined with a spatial kernel; and
   processing the image with at least the edge weight and the spatial weight associated with the second selected pixel.

11. A system comprising:
a memory component adapted to receive an image associated with a scene, wherein the image comprises a plurality of pixels with each pixel including a pixel value; and
a processing component configured to execute the instructions to:
receive the image;
select a pixel to be processed;
determine an edge weight and a spatial weight associated with the selected pixel, wherein at least the spatial weight is determined with a spatial kernel; and
process the image with at least the edge weight and the spatial weight.

12. The system of claim 11, wherein the spatial kernel is a Gaussian based kernel and/or is based on a two dimensional (2D) distribution.

13. The system of claim 11, wherein the selected pixel is an upsampled pixel, the upsampled pixel is the location of a pixel in the upsampled image, the processing the image comprises interpolating the image with, at least, the edge weight and the spatial weight, and the processing component is further configured to execute instructions to upsample the image.

14. The system of claim 13, wherein the determining the edge weight comprises:
applying an edge weight kernel to a neighborhood set of the pixels to determine weighted pixel edge values for the pixels of the neighborhood set;
determining an edge indicator value using at least the weighted pixel edge values; and
determining the edge weight using at least the edge indicator value.

15. The system of claim 13, wherein the spatial kernel comprises an N×N distribution, where N is an integer equal to or greater than 3 and the determining the spatial weight comprises:
determining a distance from the upsampled pixel to at least one pixel within a neighborhood set of the pixels, wherein the at least one pixel is a central pixel of the neighborhood set, and wherein the central pixel is a pixel of the neighborhood set closest to the upsampled pixel;
shifting the spatial kernel according to the distance; and
applying the spatial kernel to a plurality of pixels within the neighborhood set to determine the spatial weight.

16. The system of claim 13, wherein the processing component is further configured to execute instructions to:
apply a point spread function (PSF) to the interpolated and upsampled image to create a PSF processed image;
downsample the PSF processed image;
determine a differenced image by differencing the PSF processed image with the received original image;
upsample the differenced image;
apply an inverse of the PSF to the upsampled differenced image to create a convolved image; and
combine the convolved image with the interpolated and upsampled image.

17. The system of claim 11, wherein the processing component is further configured to execute instructions to:
determine pixel values of at least two pixels located on either side of the selected pixel within a portion of the image, wherein the portion includes the selected pixel;
determine a distance between the selected pixel and at least one of the two pixels;
determine a refinement weight using, at least, the pixel values of the at least two pixels and the distance between the selected pixel and the at least one of the two pixels; and
further process the processed image with at least the refinement weight.

18. The system of claim 11, wherein the processing component is further configured to execute instructions to:
apply a mask to at least a portion of the image; and
determine, after applying the mask, an edge within the image.

19. The system of claim 11, wherein:
the processing the image comprises sharpening the image with at least the edge weight and the spatial weight;
the determining an edge weight comprises:
applying an edge weight kernel to a neighborhood set of the pixels of the image to determine weighted pixel edge values for the pixels of the neighborhood set,
determining an edge indicator value using at least the weighted pixel edge values, and
determining the edge weight using at least the edge indicator value; and
the image includes a neighborhood set of the pixels, the neighborhood set includes a plurality of pixels including the selected pixel, and determining the spatial weight comprises:
determining a distance from the selected pixel to at least one pixel within the neighborhood set,
shifting the spatial kernel according to the distance, and
applying the spatial kernel to a plurality of pixels within the neighborhood set to determine the spatial weight.

20. The system of claim 11, wherein the selected pixel is a first pixel and the processing component is further configured to execute instructions to:
select a second pixel to be processed;
determine an edge weight and a spatial weight associated with the second selected pixel, wherein at least the spatial weight is determined with a spatial kernel; and
process the image with at least the edge weight and the spatial weight associated with the second selected pixel.

* * * * *